US010448438B2

(12) United States Patent
Patel et al.

(10) Patent No.: US 10,448,438 B2
(45) Date of Patent: Oct. 15, 2019

(54) WIRELESS COMMUNICATION BETWEEN A MANAGEMENT CONTROLLER AND ONE OR MORE DRIVES

(71) Applicant: Lenovo Enterprise Solutions (Singapore) Pte. Ltd., Singapore (SG)

(72) Inventors: Pravin Patel, Cary, NC (US); Theodore Brian Vojnovich, Raleigh, NC (US); Patrick Leo Caporale, Cary, NC (US); Mark E. Andresen, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 353 days.

(21) Appl. No.: 15/273,473

(22) Filed: Sep. 22, 2016

(65) Prior Publication Data

US 2018/0084591 A1 Mar. 22, 2018

(51) Int. Cl.
| | |
|---|---|
| *G06F 11/00* | (2006.01) |
| *G06F 15/173* | (2006.01) |
| *H04W 76/11* | (2018.01) |
| *G06F 11/30* | (2006.01) |
| *H04L 12/931* | (2013.01) |
| *G06F 11/07* | (2006.01) |
| *H04L 12/26* | (2006.01) |
| *H04W 76/10* | (2018.01) |

(52) U.S. Cl.
CPC ......... *H04W 76/11* (2018.02); *G06F 11/0766* (2013.01); *G06F 11/3037* (2013.01); *G06F 11/3055* (2013.01); *G06F 11/3058* (2013.01); *H04L 43/065* (2013.01); *H04L 49/40* (2013.01); *H04W 76/10* (2018.02)

(58) Field of Classification Search
CPC . H04L 12/2823; H04L 12/2825; H04L 41/04; H04L 41/046; H04L 41/06–0604; H04L 41/0695; H04L 43/065; H04L 49/555–557; H04L 49/40; G06F 11/0766–0793; G06F 11/0784; G06F 11/00; G06F 11/22; G06F 11/30–3086; G06F 12/14–1418; G06F 13/42; G05B 2219/00; G05B 2219/15068; G05B 2219/15074; G05B 2219/15119; H04W 76/10–11

See application file for complete search history.

(56) References Cited

U.S. PATENT DOCUMENTS

| | | | |
|---|---|---|---|
| 2003/0005367 A1* | 1/2003 | Lam | G06F 11/0727 714/42 |
| 2004/0073712 A1* | 4/2004 | Larson | H04L 49/351 709/249 |

(Continued)

*Primary Examiner* — Brendan Y Higa
(74) *Attorney, Agent, or Firm* — Zilka-Kotab, P.C.

(57) ABSTRACT

According to one embodiment, a computer program embodied on a tangible computer readable medium includes computer code for identifying a wireless communications gateway in communication with a management controller, computer code for establishing a wireless communications connection between one or more drives and the management controller, utilizing the wireless communications gateway, and computer code for communicating one or more of monitoring data and control data between the management controller and the one or more drives, utilizing the wireless communications connection.

18 Claims, 4 Drawing Sheets

(56) References Cited

U.S. PATENT DOCUMENTS

| | | | |
|---|---|---|---|
| 2006/0106577 A1* | 5/2006 | Hatakeyama | G08B 13/2402 702/183 |
| 2014/0136904 A1* | 5/2014 | Chang | G06F 11/3031 714/47.3 |
| 2014/0344534 A1* | 11/2014 | Kato | G06F 3/0604 711/154 |
| 2015/0081132 A1* | 3/2015 | Shirokaze | G06F 1/206 700/300 |
| 2015/0242355 A1* | 8/2015 | Dhandapani | G06F 13/102 710/13 |
| 2016/0182130 A1* | 6/2016 | Ahmed | H04B 5/0081 455/41.1 |
| 2016/0342328 A1* | 11/2016 | Rangarajan | G06F 3/061 |
| 2017/0337140 A1* | 11/2017 | Ragupathi | H04L 63/061 |

\* cited by examiner

WIRELESS COMMUNICATION BETWEEN A MANAGEMENT CONTROLLER AND ONE OR MORE DRIVES

FIELD OF THE INVENTION

The present invention relates to data communications, and more particularly to enabling wireless communication between hard drives and a management controller.

BACKGROUND

Hard drive data storage is an integral part of a computing environment. However, traditional methods of transferring management data to hard drives have various limitations, including high cost, inefficient space usage, and significant heat generation.

SUMMARY

According to one embodiment, a computer program embodied on a tangible computer readable medium includes computer code for identifying a wireless communications gateway in communication with a management controller, computer code for establishing a wireless communications connection between one or more drives and the management controller, utilizing the wireless communications gateway, and computer code for communicating one or more of monitoring data and control data between the management controller and the one or more drives, utilizing the wireless communications connection.

A method according to another embodiment includes identifying a wireless communications gateway in communication with a management controller, establishing a wireless communications connection between one or more drives and the management controller, utilizing the wireless communications gateway, and communicating one or more of monitoring data and control data between the management controller and the one or more drives, utilizing the wireless communications connection.

A system according to another embodiment includes a baseboard management controller for sending a network key to a plurality of drives, utilizing a backplane and hard wired connection, establishing a wireless connection with the plurality of drives, utilizing the network key and a wireless communications gateway, and sending a plurality of control signals to one or more of the plurality of drives, utilizing the wireless connection.

DETAILED DESCRIPTION

Figure 1:
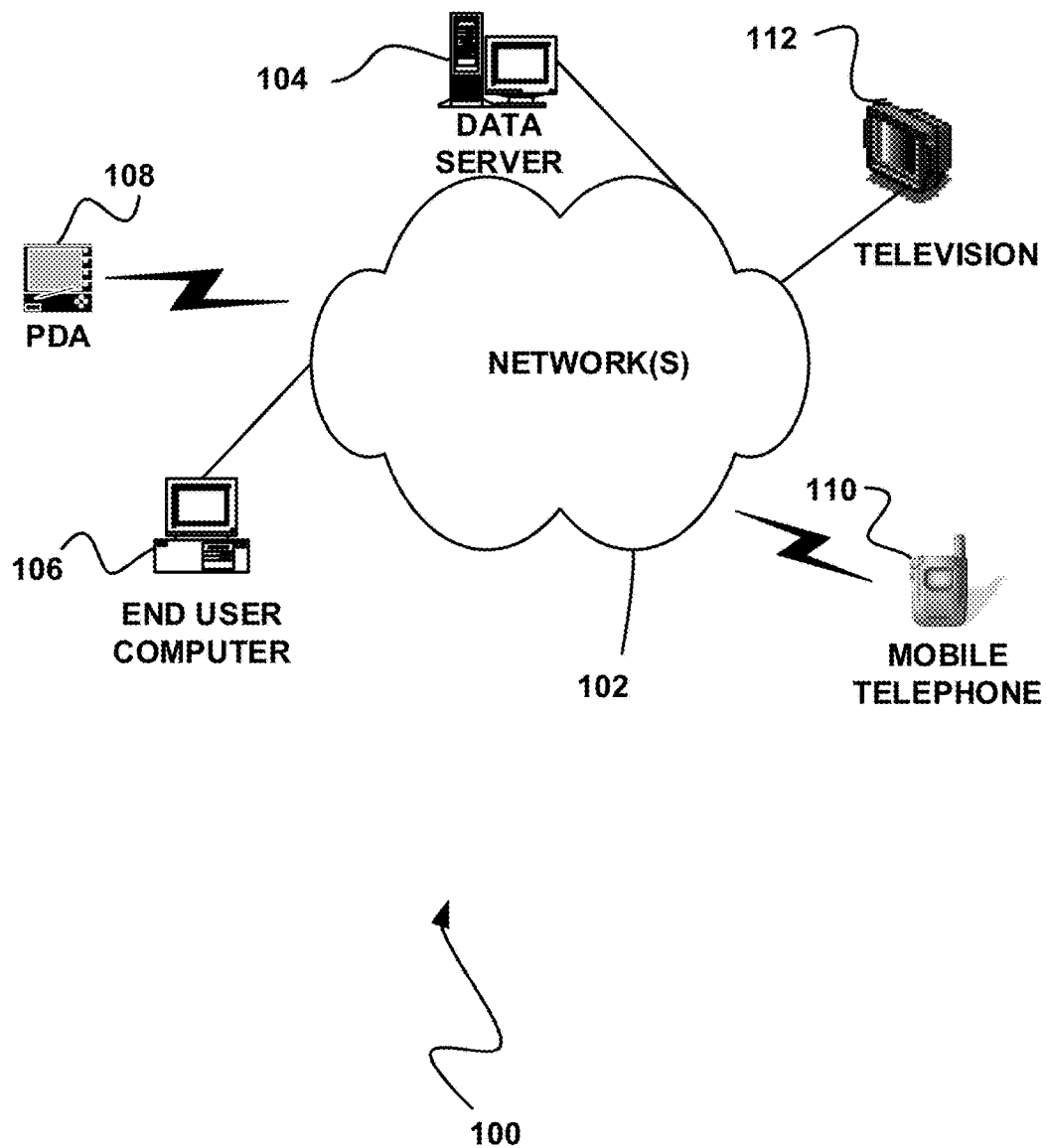
FIG. 1 illustrates a network architecture, in accordance with one possible embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any tangible medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
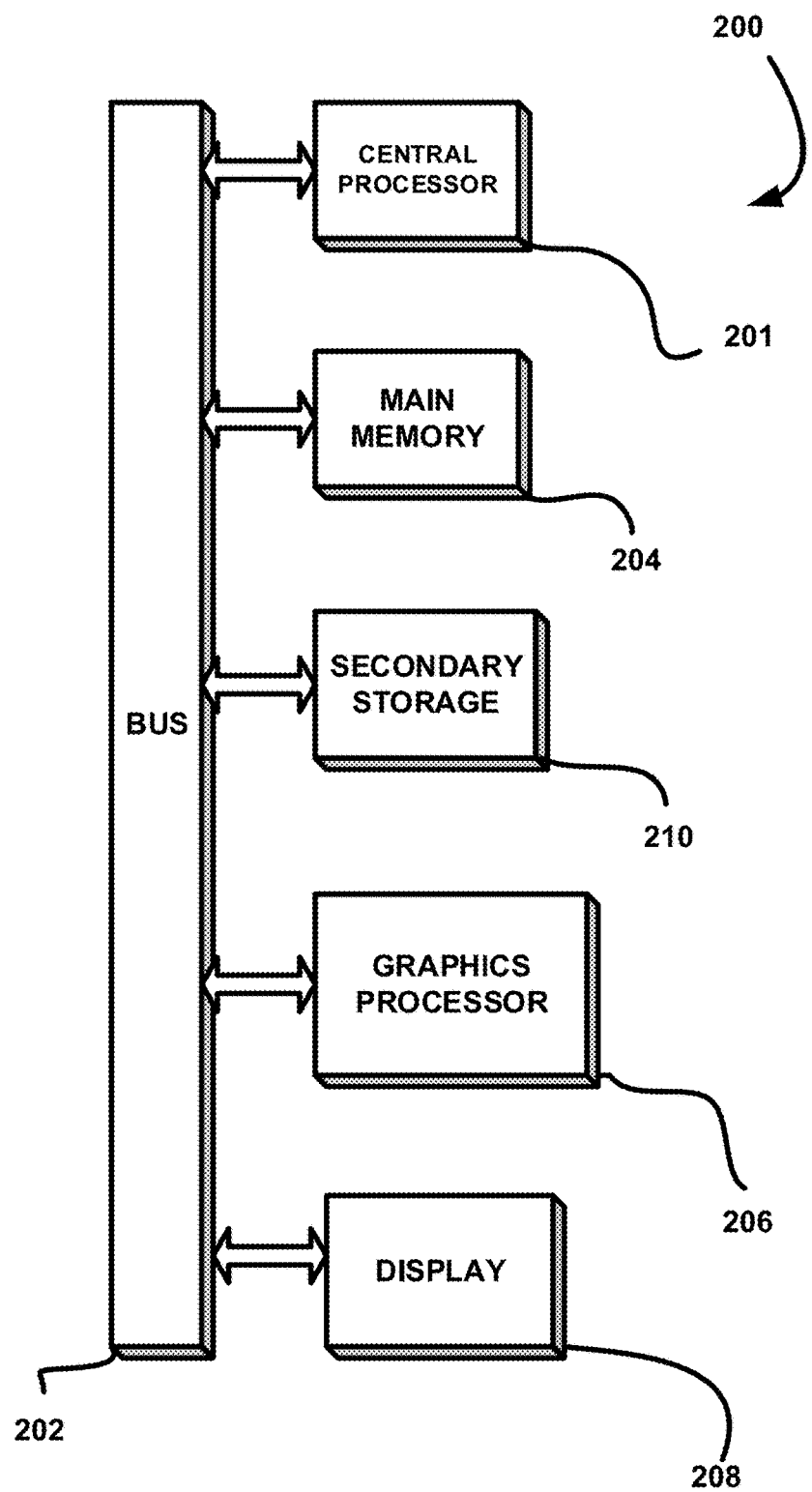
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210, volatile or non-volatile storage, and/or any other type of storage are possible examples of non-transitory computer-readable media.

Figure 3:
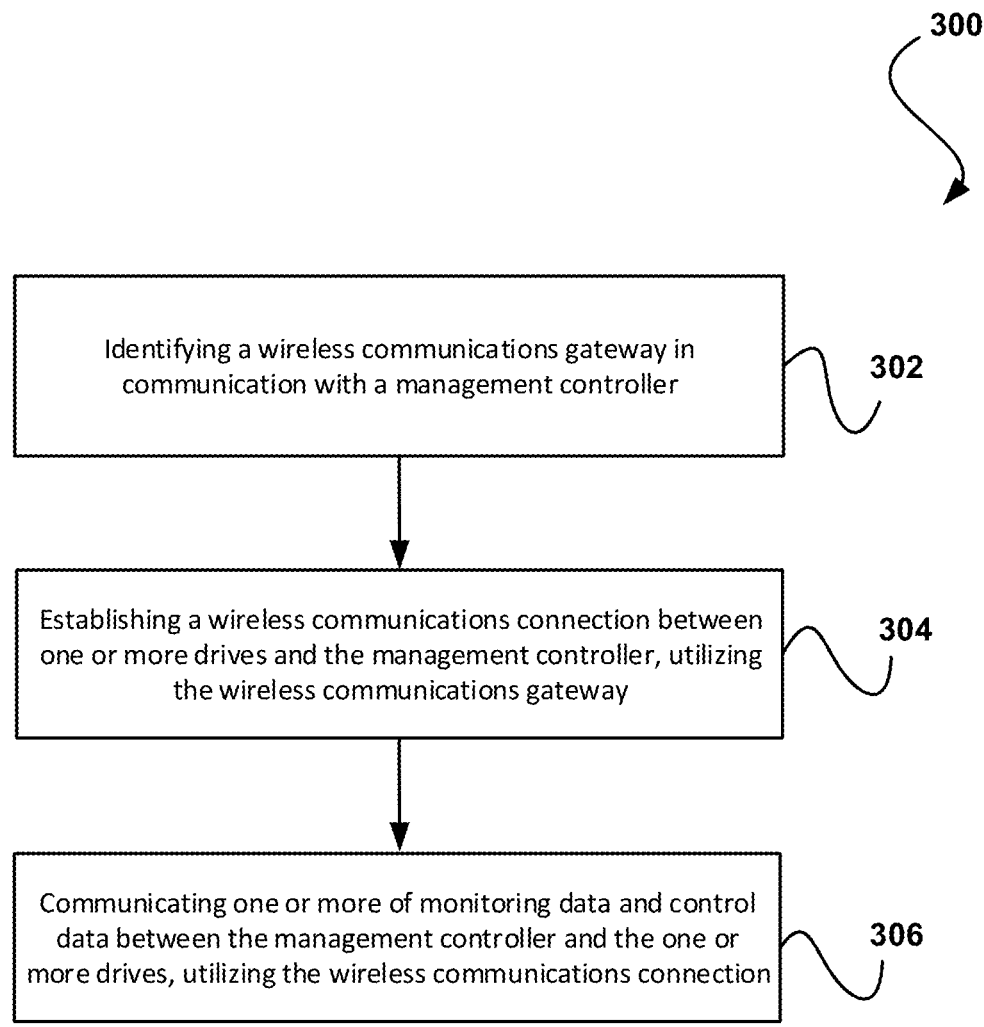
FIG. 3 illustrates a method for wireless communication between a management controller and one or more drives, in accordance with one embodiment.

FIG. 3 illustrates a method 300 for wireless communication between a management controller and one or more drives, in accordance with one embodiment. As an option, the method 300 may be carried out in the context of the details of FIGS. 1-2 and 4. Of course, however, the method 300 may be carried out in any desired environment. Further, the aforementioned definitions may equally apply to the description below.

As shown in operation 302, a wireless communications gateway in communication with a management controller is identified. In one embodiment, the wireless communications gateway and the management controller may bother be located within a computing device such as a server. In another embodiment, the wireless communications gateway may include one or more hardware elements that facilitate wireless communications (e.g., WiFi®, Bluetooth®, etc.).

Additionally, in one embodiment, the management controller may include a hardware controller within a computing device. For example, the management controller may include a baseboard management controller (BMC) that monitors and controls one or more aspects the computing device using one or more sensors. In another embodiment, the wireless communications gateway may have a direct hardwired connection to the management controller within the computing device. In yet another embodiment, the management controller may be coupled to one or more of memory and a central processing unit (CPU) of the computing device (e.g., via a bus, etc.).

Further, as shown in operation 304, a wireless communications connection is established between one or more drives and the management controller, utilizing the wireless communications gateway. In one embodiment, the one or more drives may include one or more of a hard disk drive (HDD), a solid state drive (SDD), or any other storage drive used to store data within a computing environment. In another embodiment, each of the one or more drives may be in communication with a unique wireless transceiver. For example, each of the one or more drives may have a direct hardware connection to a unique wireless transceiver. In another example, a unique wireless transceiver may be integrated into each of the one or more drives.

Further still, in one embodiment, the wireless communications connection may include any wireless connection that enables communication of data. For example, the wireless communications may include a WiFi® connection, a Bluetooth® connection, etc. In another embodiment, the one or more drives may also have a wired connection with the management controller. For example, the drives may have a direct hardware connection to a backplane connector that is directly connected (e.g., hard wired, etc.) to the management controller. In another example, the backplane may include a hardware interface between the one or more drives and one or more controllers of the drives.

Also, in one embodiment, the wireless communications connection may include one or more security measures. For example, the wireless connection may implement one or more of encryption, password protection, etc. In another embodiment, one or more of wireless connection information and wireless security information (e.g., a network key, a password, etc.) may be communicated to the one or more drives via a hard wired connection. For example, wireless connection and security information may be communicated to the one or more drives from the management controller or other module of the computing device via the backplane (e.g., on top of a data link via the backplane utilizing management component transport protocol (MCTP), etc.).

Further still, as shown in operation 306, one or more of monitoring data and control data is communicated between the management controller and the one or more drives, utilizing the wireless communications connection. In one embodiment, the management controller may communicate wirelessly with the one or more drives, utilizing the wireless communications gateway. For example, the wireless communications connection may be used to implement one or more low-bandwidth operations (e.g., sending and receiving monitoring data and control data, etc.) between the management controller and the one or more drives.

Furthermore, in one embodiment, the management controller may also communicate directly with the one or more drives utilizing a direct hardware connection to the backplane connector. For example, the hard-wired communications connection may be used to implement one or more high-bandwidth operations (e.g., performing data transfer, reads and/or writes, etc.) between the management controller and the one or more drives.

Further still, in one embodiment, the control data may include one or more control signals sent to the one or more drives by the management controller. For example, the control signals may include low speed, low bandwidth signals used to control one or more aspects of the one or more drives. In another example, the control signals may include one or more of a STATUS LED signal that controls a status LED of a drive, a PRSNT signal that identifies a drive as present or not (e.g., whether the drive is detected or not), a PWRDIS CLKREQ (power disable, clock request) signal that remotely powers the drive on and/or off and requests the drive to follow a reference clock, an IFDET signal, a PERST signal, an I2C signal, etc.

Also, in one embodiment, the control data may include simple swap device management. In another embodiment, the monitoring data may include diagnostic information about the one or more drives that is sent to the management controller. For example, the monitoring data may include self-monitoring, analysis and reporting technology (SMART) information, such as diagnostics (e.g., the existence of one or more bugs on platters, one or more head crashes, etc.), etc.

In this way, data traffic between the one or more drives and the management controller that goes through the backplane connector may be reduced. Additionally, fewer wiring layers may be necessary within the backplane, which may reduce a cost of manufacture of the backplane. Further, traffic may be reduced within the backplane, which may enable more drives to be incorporated within the server through the backplane. Further still, additional channels may be opened up within the backplane, which may reduce an amount of heat generated by the one or more drives within the server.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
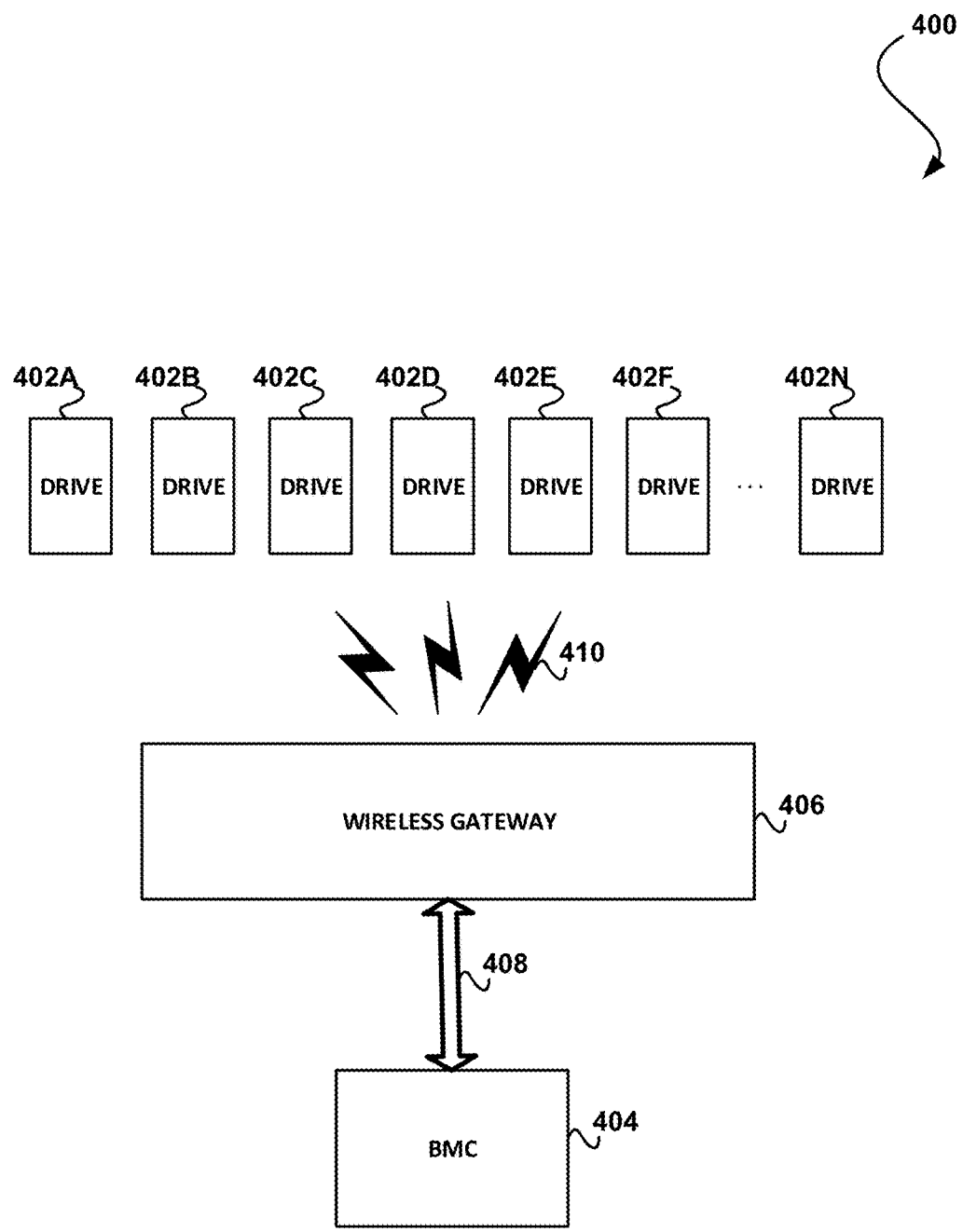
FIG. 4 illustrates an exemplary wireless management control environment, in accordance with one embodiment.

FIG. 4 illustrates an exemplary wireless management control environment 400, according to one embodiment. As shown, the wireless management control environment includes a plurality of drives 402A-N that send and receive wireless communications 410 with a baseboard management controller (BMC) 404 via a wireless gateway 406 that is physically connected to the BMC 404, utilizing a physical connection 408 (e.g., direct wiring, etc.). In one embodiment, the plurality of drives 402A-N, the baseboard management controller (BMC) 404, and the wireless gateway 406 may all be located within a computing device (e.g., a server computer, etc.).

Additionally, in one embodiment, each of the plurality of drives 402A-N may have a wireless transceiver to enable wireless communications 410 with the wireless gateway 406 (e.g., utilizing WiFi®, Bluetooth®, IEEE 802.3 wireless protocols, etc.). For example, the wireless transceiver may be physically integrated into each of the plurality of drives 402A-N, the wireless transceiver may be externally connected to each of the plurality of drives 402A-N, etc.

In another embodiment, each of the plurality of drives 402A-N may directly communicate with the wireless gateway 406, and information received by the wireless gateway may be passed on to the BMC 404 via the physical connection 408. In another example, each of the plurality of drives 402A-N may communicate with the wireless gateway 406 via a wireless service provider (e.g., a wireless router, etc.).

Further, in one embodiment, each of the plurality of drives 402A-N may also communicate directly with one or more additional controllers (e.g., controllers of the computing device, etc.), utilizing a backplane physically connected to each of the plurality of drives 402A-N.

Further still, in one embodiment, each of the plurality of drives 402A-N may be provided with wireless connectivity or security information. For example, a central processing unit (CPU) of the computing device may receive a network key and may set up a mode page with the network key that is accessed by each of the plurality of drives 402A-N. In another example, the BMC 404 or other controller may send to network key to each of the plurality of drives 402A-N using a communication means that rides on top of a data link via the backplane (e.g., management component transport protocol (MCTP), etc.).

Also, in one embodiment, control signals may be relayed wirelessly between the BMC 404 to each of the plurality of drives 402A-N, utilizing the wireless gateway 406. In another embodiment, diagnostic data may be sent between the BMC 404 to each of the plurality of drives 402A-N, utilizing the wireless gateway 406. In yet another embodiment, these control signals and diagnostic data may include low speed, low bandwidth, low power data.

In addition, in one embodiment, data transfers, reads, and writes may be relayed from one or more controllers and each of the plurality of drives 402A-N, utilizing a backplane such as a circuit board including a plurality of electrical connectors. In another embodiment, these data transfers, reads, and writes may include high speed, high bandwidth, high power data.

In this way, a server may implement an inexpensive gateway that can connect to server management controllers and that has wireless connection to drives. Since control signals may run at low frequencies and statics, power consumption may be low. Additionally, all the connections may be short from the gateway to each drive end point. Thus, the transceiver cost may also be significantly low. This may enable the employment of more drives than in traditional connectivity. This may also reduce a cost to manufacture a backplane/midplane. In one embodiment, a higher drive count may be enabled in various form factors (e.g., 1U and 2U, etc.), which may provide higher density without increasing the total infrastructure cost.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing a computer program, the computer program comprising:
   computer code for identifying a wireless communications gateway in communication with a management controller;

computer code for establishing a wireless communications connection between one or more drives and the management controller, utilizing the wireless communications gateway;

computer code for communicating one or more of monitoring data and control data between the management controller and the one or more drives, utilizing the wireless communications connection; and computer code for communicating security information associated with the wireless communications connection to the one or more drives from the management controller via a backplane.

2. The non-transitory-computer readable medium of claim 1, wherein the management controller includes a baseboard management controller (BMC).

3. The non-transitory-computer readable medium of claim 1, wherein each of the one or more drives are in communication with a unique wireless transceiver.

4. The non-transitory-computer readable medium of claim 1, wherein the one or more drives also have a wired connection with the management controller via a backplane connector.

5. The non-transitory-computer readable medium of claim 1, wherein the control data includes one or more control signals sent to the one or more drives by the management controller.

6. The non-transitory-computer readable medium of claim 1, wherein the control data includes simple swap device management.

7. The non-transitory-computer readable medium of claim 1, wherein the monitoring data includes diagnostic information about the one or more drives that is sent to the management controller.

8. The non-transitory-computer readable medium of claim 1, wherein the monitoring data includes self-monitoring, analysis and reporting technology (SMART) information.

9. A method, comprising:
identifying a wireless communications gateway in communication with a management controller;
establishing a wireless communications connection between one or more drives and the management controller, utilizing the wireless communications gateway;
communicating one or more of monitoring data and control data between the management controller and the one or more drives, utilizing the wireless communications connection; and
communicating security information associated with the wireless communications connection to the one or more drives from the management controller via a backplane.

10. The method of claim 9, wherein the management controller includes a baseboard management controller (BMC).

11. The method of claim 9, wherein each of the one or more drives are in communication with a unique wireless transceiver.

12. The method of claim 9, wherein the one or more drives also have a wired connection with the management controller via a backplane connector.

13. The method of claim 9, wherein the control data includes one or more control signals sent to the one or more drives by the management controller.

14. The method of claim 9, wherein the control data includes simple swap device management.

15. The method of claim 9, wherein the monitoring data includes diagnostic information about the one or more drives that is sent to the management controller.

16. The method of claim 9, wherein the monitoring data includes self-monitoring, analysis and reporting technology (SMART) information.

17. A system, comprising:
a baseboard management controller for:
sending a network key to a plurality of drives, utilizing a backplane and hard wired connection;
establishing a wireless connection with the plurality of drives, utilizing the network key and a wireless communications gateway; and
sending a plurality of control signals to one or more of the plurality of drives, utilizing the wireless connection.

18. The system of claim 17, wherein the baseboard management controller is coupled to memory via a bus.

* * * * *